W. A. PETERS.
CAMERA.
APPLICATION FILED JULY 28, 1920.

1,427,546.

Patented Aug. 29, 1922.

Inventor:
William A. Peters
By Rudolph Wm Lotz Atty.

UNITED STATES PATENT OFFICE.

WILLIAM A. PETERS, OF CHICAGO, ILLINOIS, ASSIGNOR, BY MESNE ASSIGNMENTS, TO INTERNATIONAL PATENT LICENSING CORPORATION, OF CHICAGO, ILLINOIS, A CORPORATION OF ILLINOIS.

CAMERA.

1,427,546.  Specification of Letters Patent.  Patented Aug. 29, 1922.

Application filed July 28, 1920. Serial No. 399,578.

*To all whom it may concern:*

Be it known that I, WILLIAM A. PETERS, citizen of the United States, residing at Chicago, in the county of Cook and State of Illinois, have invented certain new and useful Improvements in Cameras; and I do hereby declare that the following is a full, clear, and exact description of the invention, such as will enable other skilled in the art to which it appertains to make and use the same.

My invention relates to cameras and more particularly to cameras designed to fold into compact form so as to be carried in the pocket. The general objects of my invention are to provide simple means for moving a pair of film rolls with respect to the camera so as to present successive portions of the film for exposure; to provide means for moving the film and its holders entirely out of the cone of light of the camera, and for moving a ground glass into the normally exposure plane of the film; to provide means for preventing a curling of the film while being exposed; to provide simple means for regulating the amount of film exposed, and for recording the total portions of film that have been exposed; to provide simple means for automatically operating the shutter when the film portion has been moved to its exposure position; to provide means for manually winding the film to a desired starting position; to provide means for permitting a ready insertion or withdrawal of the film rolls and for maintaining the same in proper alinement with respect to the casing of the camera; to protect the film from light when access is had to the ground glass for focusing the camera; and to provide simple and effective means for substituting a plate holder or a film-pack holder in operative position for the film rolls. Further objects will appear from the following specification and from the accompanying drawings, in which:

Figure —1— is a plan view of a camera embodying my invention, with the shutter and shutter-operating mechanism omitted.

Figure —2— is a side view of the camera equipped with a shutter and operating mechasim therefor.

Figure —3— is an enlarged vertical section through the camera when folded.

Figure —4— is an enlarged section through the shutter-actuating handle of the camera.

Figures —5— and —6— are enlarged elevations of two different designs of the stop-carrying bars used for controlling the positions of the film-carrying rolls.

Figures —7— and —8— are transverse sections through Figures —5— and —6— along the lines 7—7 and 8—8 respectively.

Figure —9— is an enlarged fragmentary vertical section through the camera with the front extended.

Figure —10— is a side elevation of the slide carrying the film rolls and the actuating mechanism.

Figure —11— is a fragmentary plan view of one of the upper ends of the camera showing the means for locking a plate holder in position.

Figure —12— is a fragmentary vertical section through the camera casing along the line 12—12 of Figure —11—.

Figure —13— is a fragmentary horizontal section through the bellows front of the camera, with portions of the bellows cut away to disclose the means for drawing the inner end of the lens front into light-excluding engagement with the front of the casing.

Figure —14— is a fragmentary vertical section along the line 14—14 of Figure —13—, showing the means of guiding the camera front when slid back into the casing of the camera.

Figure —15— is a fragmentary elevation of a plate holder adapted for use with my camera.

Figure —16— is a fragmentary elevation of the same.

Figure —17— is an interior view of the detachable portion of the casing carrying the ground glass.

Figure —18— is a side view of the same.

Figure —19— is a fragmentary rear elevation of the casing showing the indicating mechanism and the digitally operable means for winding the film to its desired starting position.

Figure —20— is a fragmentary vertical section showing parts of the mechanism operating the exposure recording indicator.

Figures —21—, —22— and —23— are fragmentary views showing the roll holders in three of their respective positions.

Figure —24— is a fragmentary side elevation of the camera showing the handle for winding the film.

Figure —25— is a fragmentary section showing the said handle in its operative position and the parts connected thereto.

Figure —26— is a fragmentary side view of the roll holders showing a portion of the means for latching them in operative position.

Figures —27— and —28— are fragmentary sections through the roll holding casings and the mechanism for moving the latter, taken respectively along the lines 27—27 and 28—28 of Figure —29—.

Figure —29— is a sectional view showing the moving, latching and releasing mechanism associated with the roll-holding casings.

Figure —30— is a perspective view of the latching member carried by one of the spool holder casings.

Figure —31— is a fragmentary section through the roll holders and a portion of the casing of the camera.

Figure 32 is a fragmentary section through the indicator of the register, along the line 32—32 of Fig. 19.

Figure 1:
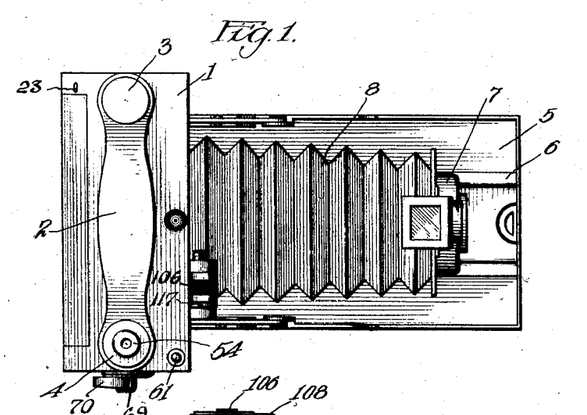
Figure 2:
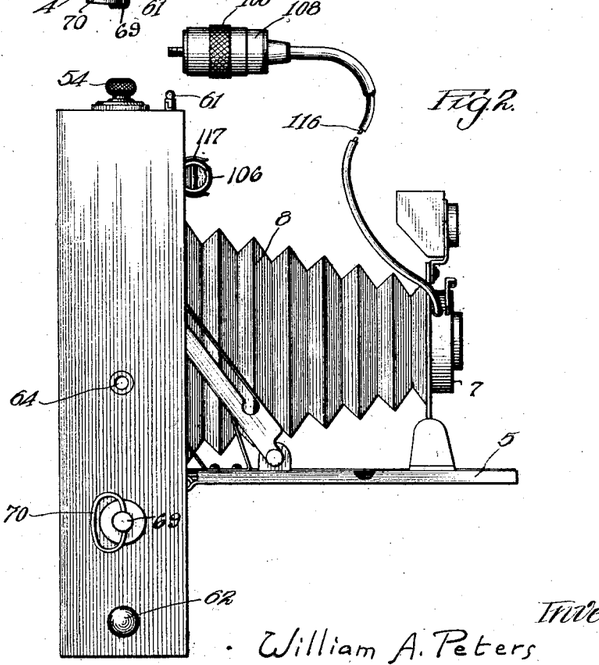
Figure 13:
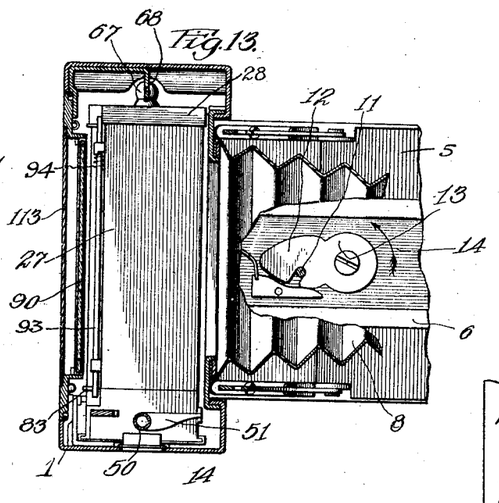
Figures 14, 16:
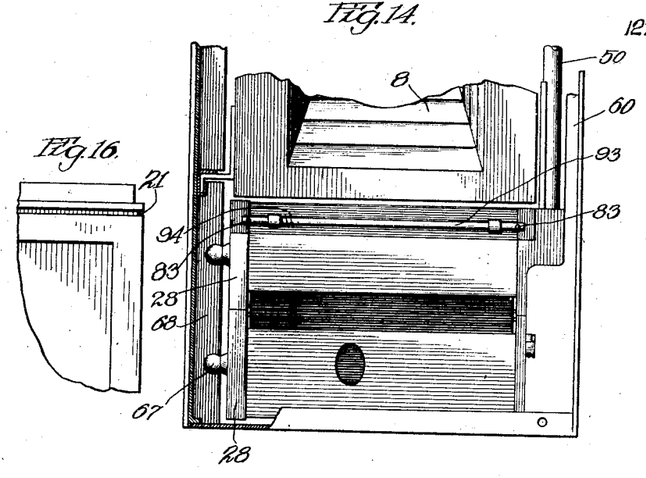
Figure 15:
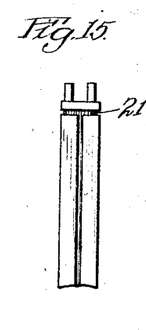

In the embodiment of the drawings, the camera of my invention comprises a rectangular casing 1 carried by a handle 2 secured to the top of the casing by studs 3 and 4, as shown in Figure —1—. The casing 1 has at its front an opening normally closed by a table 5, which table carries a track 6 for the lens front 7 which is connected to the bellows 8 after the usual manner. The front of the casing is provided with a flange 9 extending inwardly of the casing and bordering the said opening, which flange is overlapped by a forwardly directed flanged member 10 secured to the rear end of the bellows. When the extensible front of the camera is being slid out upon the track 6 of the table, a pin 11 carried by the said front engages a cam 12 secured to the table 5 by a pivot 13 and continuously spring pressed in the direction of the arrow 14 of Figure —13— by a spring not shown in the drawing. The pin 11 is connected by a spring with the inner end of the bellows front, so that the said interlatching of the pin 11 with the slotted cam 12 will place the spring under tension and cause the said tension to hold the flanges upon the inner end of the bellows front and the casing tightly overlapped, thereby preventing a leakage of light around the said opening in the casing. The operation of these tensioning and latching elements is more fully described and claimed in my previous Patent No. 1,292,036 dated January 21, 1919.

A portion of the rear of the casing 1 is normally closed by a detachable member 15, which member consists of a pair of overlapped frames 16 and 17 corresponding in general size to the contour of the plate-holder suitable for the dimensions of the camera. The plates 16 and 17 are separated on their lateral edges at two points so as to afford substantially oval sockets 18 and cylindrical sockets 19 for receiving the ends of springs secured to the portions of the casing adjacent to the said member 15. Adjacent to one edge of the said member 15 is a pivoted latch 20 adapted to enter the groove 21 in a plate-holder substituted for the member 15, thereby locking the plate-holder in operative position, the latch 20 being pressed into engagement by a spring 22 and released therefrom by a projecting trigger 23.

However, my camera is more particularly designed for use with films mounted upon rolls or spools, both spools being adapted to be moved into or out of their exposure position. In my previous Patent No. 1,031,023, dated July 2, 1912, I have shown and described a camera adapted to receive a pair of film rolls and to wind the latter through axles passing entirely through said rolls, and adapted also to have the respective rolls moved by the manipulation of two rods. My present construction enables me to expose successive portions of the film by merely reciprocating a single rod, and also presents other advantages which will hereafter appear. Thus, to facilitate the loading of the camera, I do not support the film-holding housings directly upon the casing of the camera, but mount both of them on a slide 60 comprising a side wall 24 and an end plate 25, which end plate normally forms the bottom of the camera casing.

Figure 23:
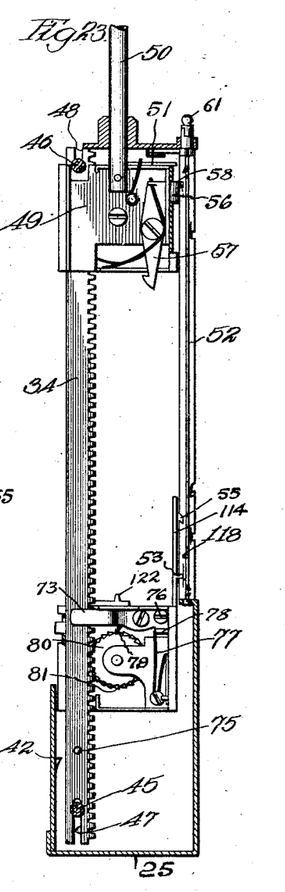
Figure 24:
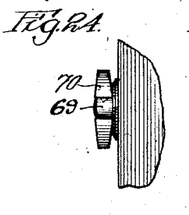
Figure 25:
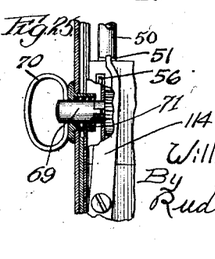
Figure 26:
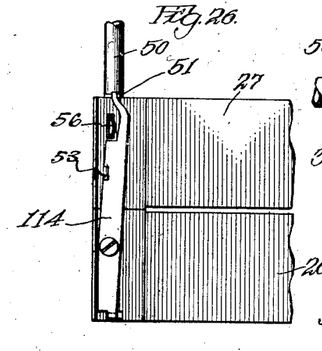
Figure 27:
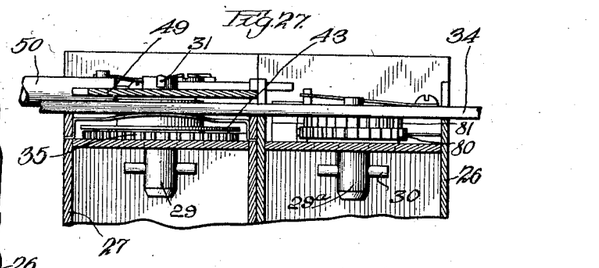
Figure 28:
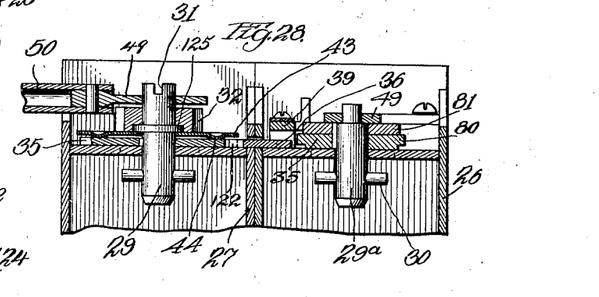
Figure 29:
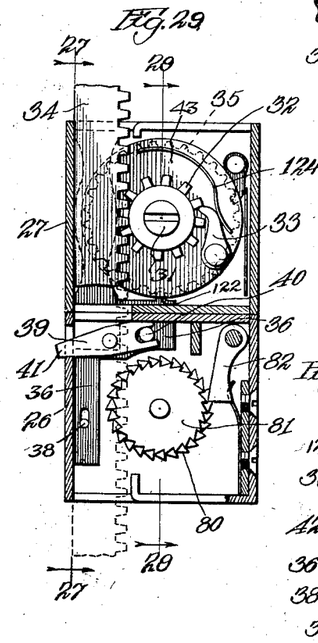
Figure 30:
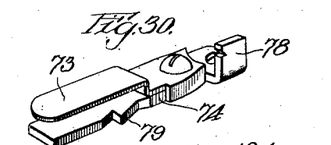
Figure 31:
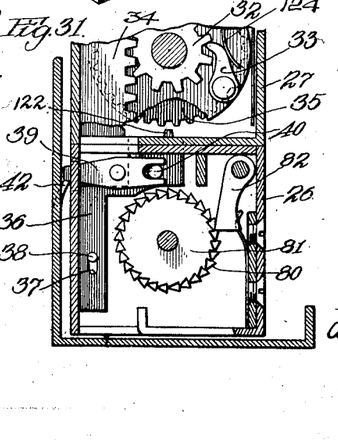
Figure 33:
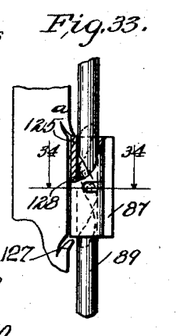
Figure 33 is an enlarged fragmentary elevational view, partly broken away, of the film straightening finger, and the adjacent part of the rod 89, as shown in Fig. 17.
Figure 34:
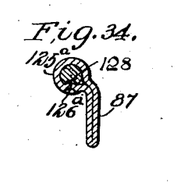
Fig. 34 is a section through Fig. 33, along the line 34—34.

Rotatably mounted on the projecting end of the slotted shaft 29 is a toothed wheel 32 intermeshed with a rack 34 and continuously engaged by a pawl 33 pressed into action by a spring 124. Both the said pawl and spring are mounted on a disk 43 interposed between an enlarged portion 125 of the said shaft 29 and a gear 35 rigid with respect to said shaft. The disk 43 has formations 44 bearing against the gear 35, being thereby sprung slightly out of its normal shape so as to exert a spring pressure on the parts between which it is interposed, whereby said disc frictionally connects the gear 35 with the shaft 29. Slidably mounted on the casing 26 which houses the film-feeding roll is a latch plate 36 equipped with a tooth 122 engaging the gear 35 when the casings 26 and 27 are adjoined, i. e. when the two film rolls are approached as closely as possible. The rack 34 is mounted upon the slide 60 of the camera and is free to slide longitudinally for the short distance limited by the engagement of pins 45 and 46 with the ends of slots 47 and 48 respectively (Figure —23—). Being thus almost stationary, the said rack tends to cause the gear 32 to rotate freely in opposite directions when the film-carrier 27 is reciprocated upon the slide 60 of the camera, and when the said film-carrier is moved upwardly, (as in Figure —31—) the pawl 33 will readily permit this rotation. However, if the said film-carrier is moved downwardly, the engagement of the toothed wheel 32 with the pawl 33 will cause the disk 43 to rotate with said toothed wheel, and the frictional engagement of the said disk with the shaft 29 will rotate the latter also, thereby winding the film on the film-receiving roll during the downward motion of the latter. This winding or taking up of the film continues until the two film-carriers are close together (Figure —29—) when the tooth 122 on the latch-plate 36 engages the gear 35, thereby stopping any further winding. During the winding operation any excess of movement of the disk 43 beyond that required for the length of film between the two rolls is compensated by a slipping of the disk with respect to the parts between which it is frictionally interposed, thus allowing for the differences in the lengths of the various convolutions on the film rolls.

For moving the film-carriers upon the slide, I equip the film-receiving carrier with a plate 49 rigidly secured to the casing 27. Attached to this plate 49 is an actuating rod 50 extending through the upper end of the camera casing and equipped with a knob 54 disposed outside the camera casing, whereby the said actuating member may be manually moved up and down. The rod 50 is secured to the plate 49 in such a way as to permit a slight rotary movement of the former about its own axis, thereby allowing it to move a finger 51 carried by said rod, so as to unlatch a catch 114 which catch normally prevents both film-carriers from being moved into the lower end of the slide for storage therein.

Figures 3, 4, 5, 7:
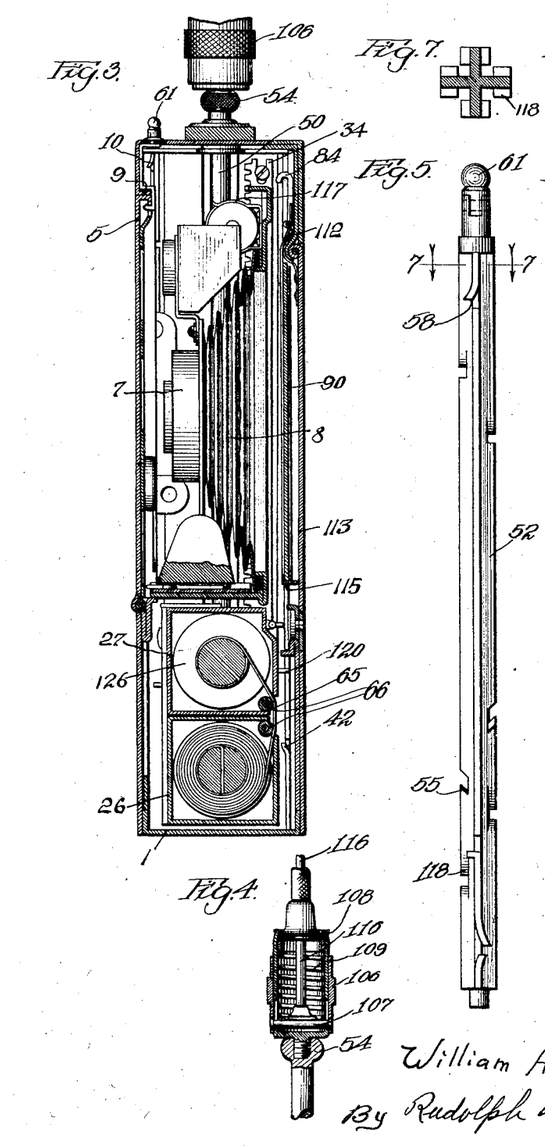
Figure 6:
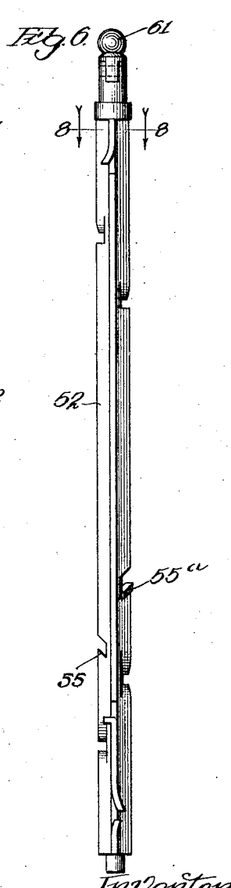
Figure 8:
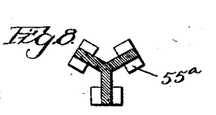
Figures 21, 22:
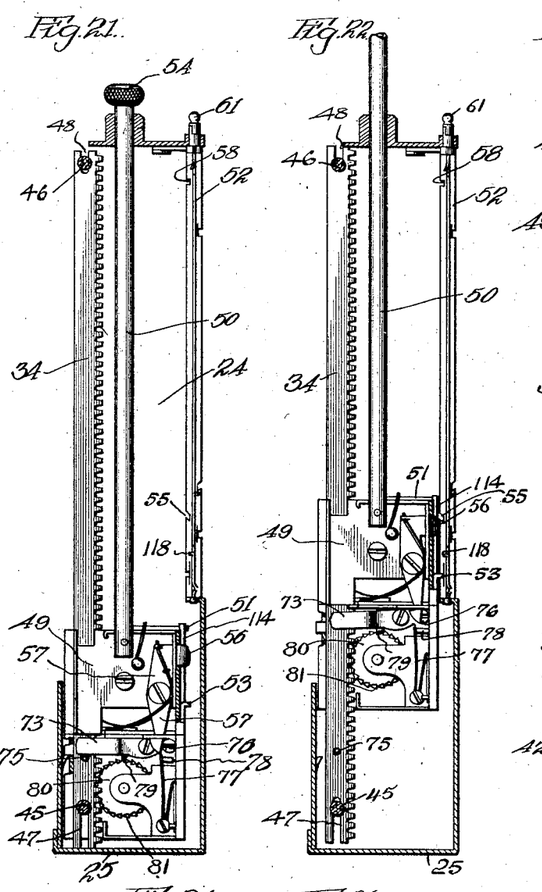

Mounted upon the slide of the camera near the forward edge thereof is a stop member 52 presenting an edge equipped with at least one stop 118 adapted to engage a projection 53 on the carrier for the film-feeding roll, and also equipped with a cam 55 adapted to engage a projecting finger 56 on a catch 57 pivoted upon the said carrier, which catch engages a portion of the other carrier (as in Figure —21—) to couple the carriers. Upon raising the actuating rod 50 until the finger 56 engages the cam 55, the latter moves the latch 57, thereby uncoupling the carriers and leaving the upper carrier free to be raised further while the lower carrier is stopped by the engagement of the projection 53 with the stop 118. The upper carrier may then be raised until engaged by another stop 58 also disposed upon the stop member 52, thereby permitting the film to be stretched between the spaced film-carriers. To vary this spacing (thereby altering the amount of film exposed) I preferably mount the member 52 rotatably upon the slide 60 and equip this member with a number of edges having the said stop and cam formations disposed at various distances from each other, as by using the triple or quadruple edged members of Figures —5— and —6—. In using such multi-edged members, any desired edge may be brought into operative position by rotating the member by means of a handle 61 normally disposed upon the top of the camera casing, this handle being preferably pivoted to the member 52 so that it can swing substantially into alinement with the axis of said member to permit a withdrawal of the handle end of this member through the top of the casing, such as is required when the slide is drawn partly out of the casing for inserting or removing the film rolls.

To load the camera, the slide 60 is released from its normal position by pressing a spring catch 62 (the handle 61 having first been turned to a vertical position), whereupon the slide 60 may be started out of the casing by pressing on the knob 54 and then manually drawn out of the lower end of the casing until the upper end of the slot 63 in the slide engaged the inwardly projecting end of the tripod-socket 64. The slide then exposes both carriers 26 and 27, so that the hinged covers 28 thereof may be opened to permit the inserting of the film-rolls, with the film 65 guided from one to the other by rollers 66 mounted in the respective carriers. The covers 28 of the carriers 26 and 27 are then closed, and the slide is returned to its normal position, during which returning slotted knobs 67 fast upon the respective covers 28 of the carriers engage a guide 68 in the casing, whereby the said carriers are alined so as to maintain the exposed portion of the film in the desired plane. When the carriers are thus disposed in the base of the camera, the slotted end 31 of the shaft of the film-receiving roll alines with a winding shaft 69 mounted in the side of the casing and normally drawn out of the path of said end 31 by the cam action of a handle 70 when the latter is in the position of Figure —24—. Upon raising the handle (as in Figure —25—), a spring 71 presses the winding shaft 69 inwardly of the casing and into engagement with the end 31 of the shaft carrying the film-receiving roll, thereby permitting the film to be wound upon said roll until the starting mark on the film is visible through a peep hole 72 (Figure —19—). The handle 61 is then turned to set the stop member for the desired size of exposure, whereupon the rod 50 is raised by means of the knob 54, thereby lifting both the film-receiving carrier 26 and the film-feeding carrier 27 coupled thereto by the catch 57. As soon as the carrier 26 begins its ascent, motion is also imparted to the rack 34 through a friction spring 73 carried by a pawl 74 (Figure —30—) which is pivoted upon the carrier 26, thereby rocking the lever 39 and drawing the latch-plate 36 out of engagement with the gear 35 associated with the film-receiving roll.

As soon as the friction between the spring 73 and the rack 34 has raised the latter to its extreme upper position (where it is stopped by the stop 46), a continued raising of the carrier 26 and hence of the pawl 74 permits the latter to be rotated about its pivot 76 by the pressure of a spring 77 on the free arm 78 of said pawl, thereby forcing a tooth 79 on said pawl into engagement with a ratchet wheel 80 connected to the shaft holding the film-feeding roll, which pawl then prevents this roll from retracting any film. On continuing the pull on the knob 54, both film carriers are then raised until the lower one is halted by the stop 118, the catch 57 being simultaneously therewith released by the cam 55, whereupon a further raising of the actuating rod 50 would readily tend to raise the film-receiving carriers still further. However, such a further motion requires a feeding of the film from the film-roll, which latter is latched through the said engagement of the tooth 79 with the ratchet wheel 81. To release this latching, as soon as the lower carrier has been locked by the stop member (this being readily tangibly appreciated by the operator), the actuating rod 50 is given a reverse motion somewhat greater than the permissible movement of the rack 34, thereby causing the friction of the member 73 against the rack to move the latter to its lowest position, whereafter the continued friction between the said parts will tilt the member 74 out of its latching relation (of Figure —22—) into the unlatching position of Figure —23—. This permits the film to be fed from the lower film roll, thereupon a continued raising of the rod 50 will raise the film-receiving carrier until halted by the stop 58 on the stop member 52.

Figures 17, 18, 19, 20, 32:
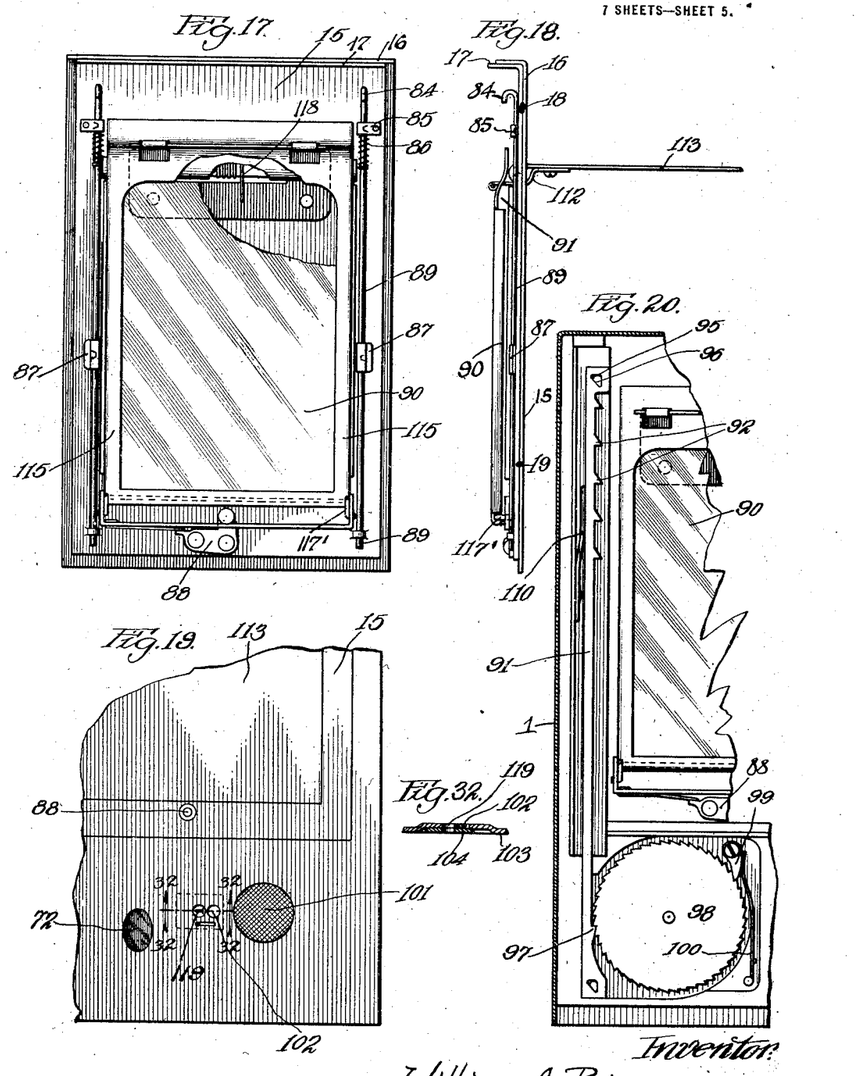

During this separation of the film-carriers, film will be stretched therebetween for exposure, as the engagement of the teeth on the rack 34 with those of the wheel 32 will rotate the film-receiving roll in proportion to the separating movement of the said carrier. When being thus stretched, the portion of the film intended for exposure will slide over and be guided by the forward or smooth face of a ground glass 90 mounted close to the rear side of the camera casing. To prevent a curling of this stretched portion of the film, I mount upon the carrier 27 a rotatable rod 93 carrying a pair of dogs 83 yieldingly held in position by a spring 94 associated with said rod. Upon raising the carrier 27 to its extreme upper position, the said dogs engage hooks 84 at the ends of rods 89 slidably mounted at opposite sides of the film in guides 85, said rods being returned after such sliding by springs 86. Associated with the respective rods 89 and connected thereto through spiral cam formations (not shown in the drawing) are fingers 87 normally disposed on opposite sides of the path of the film, but moved by said cam formations into engagement with opposite edge of the film (as shown in dotted lines in Figure —17—) when the said sliding of the rods 89 actuates the cam formations thus pressing edge portions of the film against the frame 115 carrying the ground glass 90. Each finger 87 has integral therewith a sleeve 125$^a$ encircling a portion of one of the rods 89 and prevented from sliding on the rods by prongs 127 on the adjacent parts of the frame 115. Each sleeve 125$^a$ has a projection 126$^a$ entering a cam-slot 128 on the adjacent rod, where a longitudinal movement of said rod causes the sleeve and the finger carried by the latter to be rotated with respect to the rod. The fingers 87, which are considerably narrower than the minimum width of exposure for which the stops on the member 52 are designed, will then be held in their film-straightening positions as long as the dogs 83 hold the sliding rods 89 raised, i. e., as long as the film-receiving carrier is in its uppermost position thus maintaining the exposable portion of the film substantially flat during the exposure thereof, any variations in the exact alinement of the various parts being compensated by the springs 94 which permit a yielding of the dogs 83.

Figure 9:
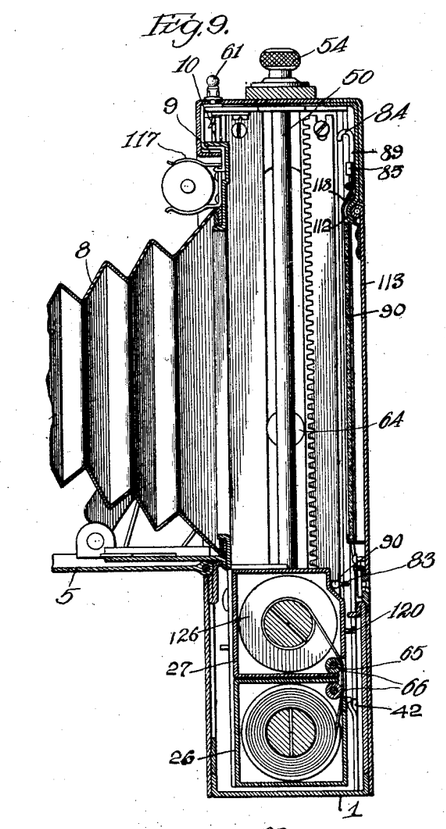
Figure 10:
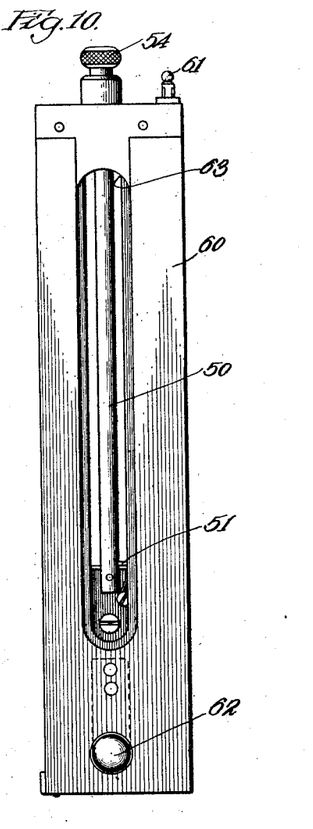
Figure 11:
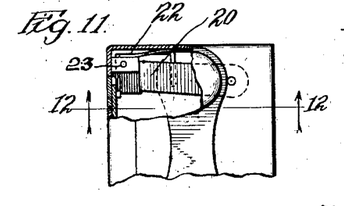
Figure 12:
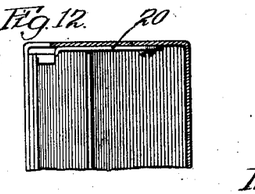

To effect the exposure without the manipulating of added parts, I preferably couple to the knob 54 a shutter-actuator comprising an inner casing 108 threadedly connected to said knob, an outer knurled casing 106 sliding upon the inner casing, a shutter-actuating flexible member 116 connected to the outercasing, and a spring 109 resisting the relative sliding of the said casings. The member 116 is connected to any suitable shutter-mechanism designed for operation by a slight movement, and the actuator just described may readily be unscrewed from the knob 54 and held by a clip 117 on the camera front (Figure —9—). When this actuator is in position (as in Figures —3— and —4—) the knurled outer casing forms a handle by which the actuating rod 50 may be raised, during which raising the spring 109 prevents relative motion of the parts of the said actuator until the rod 50 is stopped by the engagement of the film-receiving carrier with the stop 58, whereupon the continued upward movement of the handle 106 will compress the spring 109 through the cross-bar 107, thereby moving the member 116 attached to this bar and actuating the shutter. Thus a substantially single rectilinear movement of the said handle successively moves both film-carriers to their respective positions and thereafter actuates the shutter, the reciprocation required for releasing the film-feeding when the feeding roll has reached its operative position being too slight to effect the actuating of the shutter.

Upon moving the handle 106 in the opposite direction, the meshing of the wheel 32 with the rack 34 causes the film-receiving roll to wind up the portion of the film which has been exposed, and as the carrier 26 is locked in position with respect to the casing, it affords a ready stop to limit the downward movement of the film-receiving roll and the actuating member connected thereto. Moreover, since the carrier 26 remains stationary, the releasing of the film-feeding roll remains undisturbed, hence the slight reverse movement above described is required only in the initial operation or prior to the exposing of the first section of the film, after which a simple reciprocation of the actuating member effects the entire operation of exposing successive sections of the film. Consequently, my camera may readily be used for taking moving pictures and by adjusting the stops to correspond to a relatively short section of film, several dozen such exposures may be made in rapid succession upon a standard roll of film by the simple reciprocation of the handle 106. Then, after any such reciprocation, both film-carriers may readily be returned to their lowered or storage position (Figures —3— and —21—) by slightly rotating the knob 54 or handle 106 when the carriers are abutted and then continuing the downward movement of the said knob or handle.

While the carriers are thus lowered, both the carriers and the film are out of the cone of light of the camera and enable the light to strike the ground glass 90, which may then be used for accurate focusing, access being had to it by opening a door 113 hinged to the detachable member 15. However, since the film when being exposed bears against the smooth side of the said glass, the roughened or rear side is normally out of the focal plane of the camera. To compensate for this, I support the frame 115 of the ground glass between links 117' pivoted to the frame 115 near the lower end of the door and links 112 carried by the door, whereby the opening of the door will move the ground glass forwardly for a sufficient distance to bring its roughened surface into the focal plane, that is to say, the plane occupied by a film section when being exposed. Associated with said links and door is a spring 118 which simultaneously holds the door open and maintains the ground-glass holder 115 stationary when the door has been unlatched by releasing the catch 88. The links 112 being rigid with respect to the door, carry the ground-glass holder back to its normal position when the door is closed, thereby drawing the said holder and glass out of the path of film-carriers and bring the smooth surface of the glass where it will afford a guide and bearing for the film when stretched for exposure.

The idea of positioning the ground glass to move its ground surface into and out of the focal plane of the camera is not claimed herein, such forming the subject matter of my Patent No. 1,374,678, dated Apr. 12, 1921.

While the film-carriers of my camera are preferably adapted to receive standard sized film rolls, it will be evident that by varying the position of the stop member 52, the length of film stretched for exposure by each reciprocation of the actuating member may be varied considerably. In practice, I preferably arrange the stop and cam formations on the various edges of a stop member 52 so that the resulting lengths of film exposures will be multiples of the minimum length; as for example, once, twice or thrice the said minimum length. I also preferably provide an indicator for showing the total length of film that has been presented for exposure, this length being preferably indicated in multiples of the said minimum exposure length. For this purpose, I equip the casing of the camera with a rotating indicator exposing figures through either of two openings 102 or 119, which may interchangeably be alined with a corresponding opening on a slide 104 (Figures —19— and —32—). Associated with the said indicating disk is a ratchet wheel 98 normally kept from moving backward by a pawl 99 pressed against said wheel by a spring 100. The teeth of the wheel 98 are also engaged by a tooth 97 on a ratchet member 91 slidably carried by the casing and continuously pressed into its normal position by a spring 110 and equipped with a plurality of uniformly spaced teeth 92. The member 91 has cam formations 96 engaging pins 95 on the casing, the said pin and cam formations co-operating to move the ratchet member laterally when moved longitudinally by the engagement of one of the said teeth 92 with an object engaging said teeth. In operating the camera, the teeth 92 are successively in the path of a trip 120 mounted upon the carrier 27, so that the said trip will engage one or more of the said teeth according as the film-stretching carrier is moved one or more times the length of the minimum exposure width of the film. Consequently, the member 91 will be caused to turn the ratchet wheel 98 by as many teeth of the latter as there are teeth 92 engaged by the said trip, each of the teeth 92 being successively moved out of the path of the trip by the said action of the cams 96 and the pins 95 associated therewith. To set the indicator disk to its proper zero point when starting a new film, I connect thereto a roughened disk 101 disposed substantially flush with the surface of the casing and adapted to be rotated by frictional engagement with a finger.

While I have illustrated my invention as applied to a folding or pocket type of camera, it will be evident that the various features thereof may readily be embodied in cameras of other types; as also, that the various details herein disclosed may be modified many ways without departing from the spirit of my invention.

I claim as my invention:

1. In a camera, the combination with a pair of film spools, of a holder for said spools, manually operable means for simultaneously moving both spools with respect to the holder, and stop means engaging the respective spools to latch the same in spaced relation when moved in one direction by said manually operable means; said stop means including a multi-edged member carried by said holder and equipped with a plurality of stops disposed upon the edges thereof, and auxiliary stop elements associated with the said spools, the said member being rotatable to bring each of its respective edges into operative alinement with the said auxiliary stop elements.

2. In a camera, the combination with a pair of film spools, of a holder for said spools, manually operable means for simultaneously moving both spools with respect to the holder, and stop means engaging the respective spools to latch the same in spaced relation when moved in one direction by said manually operable means; said stop means including a multi-edged member carried by said holder and equipped with a plurality of stops disposed upon the edges thereof, and auxiliary stop elements associated with the said spools, the said member being rotatable to bring each of its respective edges into operative alinement with the said auxiliary stop elements, the spacing between the stops upon the respective edges of the said multi-edged member being so proportioned that the resulting widths of film exposed will be multiples of a given minimum.

3. In a camera, the combination with a pair of film spools, of a holder for said spools, manually operable means for simultaneously moving both spools, with respect to the holder, and stop means engaging the respective spools to latch the same in spaced relation when moved in one direction by said manually operable means; said stop means including a multi-edged member carried by said holder and equipped with a plurality of stops disposed upon the edges thereof, and auxiliary stop elements associated with the said spools, the said member being rotatable to bring each of its respective edges into operative alinement with the said auxiliary stop elements, the spacing between the stops upon the respective edges of the said multi-edged member being so proportioned that the resulting widths of film exposed will be multiples of a given minimum; winding means associated with said manually operable means for causing the film to travel from one spool to the other, and indicating means associated with said manually operable and winding means for indicating the travel of the film from one spool to another in terms of the said minimum.

4. A camera, including a shutter, relatively movable film-feeding and film-receiving rolls, reciprocable means for separating and approaching said rolls, and means associated with said shutter and said reciprocable means for causing the latter to operate the shutter after the rolls have been separated.

5. In a camera, the combination with a casing equipped with a perforation, of a slide carried thereby, relatively movable film-feeding and film-receiving rolls carried by said slide, actuating means associated with said rolls for relatively moving the same, a rotatable stop member carried by said slide and associated with said rolls to limit the movement thereof and projecting through said perforation, and a handle disposed upon the exterior of the casing and connected to the stop member for rotating the latter, said handle normally extending transversely to the axis of the stop member and connected to the latter by a pivotal connection permitting the handle to be disposed substantially in axial alinement with the stop member to allow the withdrawal of the said slide and stop means from the casing.

6. A camera including a holder for a stretched film portion, a ground glass bearing with its smooth surface against said stretched film portion, means for moving the film portion out of its stretched position, and means for thereafter moving the ground glass to bring its roughened surface substantially into the plane formerly occupied by its smooth surface.

7. In a film camera, the combination with a film-actuating member, of a rotatable stop member having a plurality of edges adapted interchangeable to be rotated into alinement with a portion of the film-actuating member, each of said edges equipped with a stop element adapted to engage the film-actuating member to limit the movement of the latter.

8. In a camera, the combination with a casing equipped with a perforation, of a slide carried thereby, relatively movable film-feeding and film-receiving rolls carried by said slide, actuating means associated with said rolls for relatively moving the same, a rotatable stop member carried by said slide and associated with said rolls to limit the movement thereof and projecting through said perforation, and a handle disposed upon the exterior of the casing and connected to the stop member for rotating the latter, said handle normally extending transversely to the axis of the stop member and connected to the latter by a pivotal connection permitting the handle to be disposed substantially in axial alinement with the stop member to allow the withdrawal of the said slide and stop means from the casing, a door carried by the casing and normally closing the said aperture, connections between said door and ground glass for causing the opening of the door to move the ground glass into its said plane, and spring means associated with said door and ground glass for returning the latter to its normal position upon the closing of the door.

9. A camera including relatively movable film-feeding and film-receiving rolls, actuating means for relatively separating said rolls to stretch a film portion therebetween, and means operated by said actuating means and engaging edge parts of said film portion to prevent a curling of the latter.

10. In a camera, the combination with a film-feeding and a film-receiving roll, of reciprocable actuating means for causing the film to travel from the former to the latter of said rolls, straightening means engaging an edge part of the film to prevent curling of the latter, and means connecting said actuating and straightening means for causing the reciprocation of the former to move the latter into and out of its said engagement with the film.

11. In a camera, the combination with a film-feeding and a film-receiving roll, of actuating means for relatively moving said rolls to stretch a film portion therebetween and for winding the previously stretched film portion on the receiving roll, a pair of pivoted fingers respectively engaging opposite edge parts of said stretched film portion to prevent curling thereof; and means operated by said actuating means for moving said pivoted fingers into their said engaging position after the said film portion has been stretched, and for moving said fingers out of the path of said rolls when the previously stretched film portion is being wound on the receiving roll.

12. In a film camera, the combination with a casing, of a slide carried thereby, a pair of film rolls carried by the slide and movable with respect thereto, and means for moving said rolls to adjacent positions at one end of the slide, the slide movable with respect to the casing to permit access to the rolls while in their said adjacent positions without detaching the slide from the casing.

13. In a folding camera, the combination with a casing having an anterior opening, of a table carried by the casing and forming a closure for said opening when the camera is folded, a film-feeding and a film-receiving spool carrier both movable within the casing, a latch for maintaining the table in its closure position and spring means interposed between the table and one of said carriers, said spring means tending to force the table out of its closure position and cooperating with the latch to prevent the last-named carrier from moving with respect to the casing.

14. In a camera, the combination with a casing, of a slide carried movable with respect thereto, a film-feeding and a film-receiving roll, and a pair of casings housing said rolls respectively, each of said casings secured at one end to said slide, there being cooperative formations upon the casing and other ends of said carriers for maintaining the axes of the latter in a predetermined plane.

15. In a camera, the combination with a casing, of a slide movable with respect thereto, a film-feeding and a film-receiving roll, and a pair of carrier casings housing said rolls respectively, each of said carrier casings secured at one end to said slide and open at its other end to permit the insertion of a roll therein, and lids secured to said carrier casings and normally closing the open ends thereof, said lids and the casings of the camera being equipped with co-operating formations for maintaining the axes of the carrier casings in a predetermined plane.

16. In a camera, a shutter, relatively movable film-feeding and film-receiving rolls, actuating means for relatively separating said rolls, and means associated with said shutter and operated by said actuating means for causing the latter to operate the shutter at a predetermined point in the relative separation of said rolls.

17. In a camera, the combination with a casing and a shutter, of film-feeding and film-receiving rolls independently bodily movable with respect to the casing, actuating means for moving both rolls simultaneously in the same direction and thereafter advancing the receiving roll beyond the feeding roll, stop means for limiting said advancement of the receiving roll, and means associated with the said actuating and stop means and said shutter for causing the actuating means to operate the shutter.

18. In a film camera, the combination with a shutter, of relatively separable film-feeding and film-receiving rolls, actuating means for relatively separating said rolls, stop means for limiting said separation, and means associated with said shutter and stop and operated by said actuating means for operating the shutter when the rolls have reached their said limit of separation.

19. In a film camera, the combination with a casing, of means for stretching a film portion with the sensitive surface thereof in the focal plane and within the cone of light of the camera, a ground glass mounted in the casing and presenting its smooth surface substantially contiguous to said film portion when the latter is stretched, means for moving the film entirely out of the cone of light of the camera, and separately operable means for thereafter moving the ground glass to bring the ground surface of the latter into the focal plane of the camera.

20. In a film camera, the combination with a casing having a posterior opening, of means for positioning a portion of the film in an exposure plane adjacent to said posterior opening, means for moving the film out of its said exposure plane, a ground glass visible through said posterior opening, a door normally closing said opening, and connections between said door and ground glass for causing the opening and closing of the door respectively to move a surface of the ground glass into and out of the plane occupied by the film when in its said exposure position.

21. In a film camera, the combination with a casing having a posterior opening, of a ground glass visible through said opening and normally presenting its forward smooth surface substantially in the focal plane of the camera, actuating means for stretching a film portion across said ground glass and in contact with said smooth surface thereof, retracting means for moving the film out of the cone of light of the camera, and means for moving the ground glass to dispose the roughened surface of the latter in the focal plane of the camera.

22. In a film camera, the combination with casing having a posterior opening, of a ground glass visible through said opening and normally presenting its forward smooth surface substantially in the focal plane of the camera, actuating means for stretching a film portion across said ground glass, a frame for said ground glass, and means for pressing edge portions of said film portion against said frame to prevent a curling of said film portion.

23. In a film camera, the combination with a casing having a posterior opening, of a ground glass visible through said opening and normally presenting its forward smooth surface substantially in the focal plane of the camera, actuating means for stretching a film portion across said ground glass and in contact with said smooth surface thereof, retracting means for moving the film out of the cone of light of the camera, and means for moving the ground glass to dispose the roughened surface of the latter in the focal plane of the camera, and means operated by said actuating means and released by said retracting means for pressing edge portions of said film portion against the ground glass to prevent a curling of said film portion.

24. In a film camera, the combination with a shutter, of relatively movable feeding and receiving rolls for said film, an actuating member for relatively moving said rolls, a handle movable with respect to the actuating member, spring means associated with the actuating member and handle and normally preventing relative movement thereof, and shutter-actuating means associated with said actuating member and said handle for causing relative movement thereof to operate the said shutter.

25. In a camera, in combination with a casing and a slide carried thereby, a film-feeding and a film-receiving roll both carried by the slide, means carried by the slide for relatively separating said rolls and feeding the film from one to the other thereof, and independent means carried by the casing and associated with the film-receiving roll for rotating the latter.

26. In a camera, in combination with a casing and a slide carried thereby, a film-feeding and a film-receiving roll both carried by the slide, winding means carried by the casing and associated with the film-receiving roll for rotating the latter, and means for moving said winding means into or out of operative relation to said film-receiving roll.

27. In a camera, the combination with a casing and a pair of relatively movable film-holders mounted therein, of a film-carrying roll disposed in each holder, winding means carried by said casing, means for operatively connecting the winding means with one of said rolls when the latter is in a predetermined position with respect to the casing, and means for simultaneously drawing said winding means out of its said operative engagement and out of the path of movement of the said holders.

28. In a camera, the combination with a casing and a pair of relatively movable carrier-casings carried thereby, of a roll-support rotatably mounted in each carrier-casing, winding means mounted on the casing and operatively engaging one of said roll-supports when the carrier-casing upon which the latter is mounted is in a predetermined position, and means operable from the exterior of the casing for drawing said winding means out of its said operative engagement.

29. In a film camera, the combination with a film-feeding mechanism, of a reciprocable slidable element moved by said mechanism, a pair of pivoted fingers adapted to engage opposite edge portions of the film portion when the latter is in its exposure position, and connections between said element and said fingers for causing reciprocal movements of the former to move said fingers into and out of their said engagement with said film portion.

30. In a camera, the combination with a casing, of a slide carried thereby and movable with respect thereto, a film-feeding and a film-receiving roll both carried by the slide, mechanism carried by the slide for separating said rolls to stretch a portion of the film therebetween, and means carried by the casing and retractably associated with said film-receiving roll for imparting an initial tension to said film.

31. In a camera, the combination with a shutter, of relatively movable feeding and receiving rolls for said film, an actuating member for relatively moving said rolls, a handle movable with respect to the actuating member, spring means associated with the actuating member and handle, and normally preventing relative movement thereof, said spring means requiring a greater pressure to overcome the same than that required for operating the actuating member; stop means associated with at least one of said rolls for limiting the movement thereof, said spring means permitting a continued movement of the handle upon continued pressure thereon after the actuating means have been stopped by the said stop means; and shutter-actuating means associated with the said handle and actuating means for causing the said continued movement of the former to operate said shutter.

32. In a camera, in combination with a shutter, a casing and a pair of film-carrying rolls, an operating member movable with respect to the casing, latching means operably connecting said member with said rolls to cause a movement of said member to move both rolls with respect to the casing, stop means associated with the respective rolls for stopping the latter successively at predetermined points in the movement of said member, and shutter-actuating means associated with said member and actuated by the movement of the member after the said stopping of both rolls.

33. In a camera, in combination with a shutter, a casing and a pair of film-carrying rolls, an operating member movable with respect to the casing, latching means operably connecting said member with said rolls to cause a movement of said member to move both rolls with respect to the casing, stop means associated with the respective rolls for stopping the latter successively at predetermined points in the movement of said member, and shutter-actuating means associated with said member and actuated by the movement of the member after the said stopping of both rolls, and spring means associated with said member and shutter-actuating means for returning the latter to its initial position after a cessation of the movement of the said member.

34. In a camera, in combination with a supporting member, a pair of film spools carried thereby and movable with respect thereto, a rack slidably mounted on said supporting member, a latch associated with said supporting member and one of said spools for normally preventing relative motion thereof, and a friction member connecting said rack with one of said spools, the power required to overcome said frictional connection being less than that required to move the said spool.

35. In a camera, the combination with a casing, of a pair of film rolls, a gear connected to one thereof, a rack movable with respect to the camera and meshing with the gear, means for preventing rotation of the gear in one direction, a lever pivoted on the rack, means associated with said lever and casing for causing the lever to be moved about its pivot when the rack is approaching its limit of travel in one direction, and a latch connected to the lever and actuated by the said movement thereof to lock said gear against rotating in the other direction.

36. In a camera, the combination with a film-feeding and a film-receiving roll, of a shaft rigid with respect to the former, a pair of ratchet wheels upon said shaft equipped with teeth facing in opposite directions; a pawl normally engaging one of said wheels, a second pawl normally out of engagement with the other thereof, actuating means for relatively moving said rolls, and friction means associated with said actuating means for causing a motion of the latter in one direction to force said second pawl into engagement with the last-named ratchet wheel.

37. In a camera, the combination with a pair of relatively movable film-carriers, of a shaft mounted upon each thereof, a gear rigid with respect to one of said shafts, and a latch slidably mounted upon the carrier for the other of said shafts, said latch locking said gear against rotation when the film-carriers are closely approached to each other.

38. In a camera, the combination with a casing, of a film-roll movable with respect thereto, a shaft rigid with respect to said roll, a toothed wheel loose upon the shaft, means for causing movement of the roll with respect to the casing to rotate said wheel, a member frictionally connected to said shaft, and a spring-pressed pawl carried by said member and engaging the toothed wheel when the latter is rotated in one direction.

39. In a camera, the combination with a casing, of a pair of roll-holders both movably carried thereby, an actuating member connected to one of said roll-holders for moving the latter with respect to the casing, coupling means associated with said roll-holders and actuated by a close approaching thereof, and releasing means associated with said casing for uncoupling the roll-holders when both have been moved to a predetermined part of the casing.

40. In a camera, the combination with a casing, of a pair of roll-holders both movably carried thereby, an actuating member connected to one of said roll-holders for moving the latter with respect to the casing, coupling means associated with said roll-holders and actuated by a close approaching thereof, and releasing means associated with said casing for uncoupling the roll-holders when both have been moved to a predetermined part of the casing; said releasing means including a finger carried by one of the roll-holders, and a rotatable member carried by the casing and equipped with a number of rotationally separated cams spaced at different points longitudinally of said member; the rotation of said member permitting any one of said cams to be disposed within the path of said finger, whereby the engagement of the cam with the finger will actuate said releasing means.

41. In a camera, the combination with a casing and a pair of film rolls, of a holder for each of said rolls, and a slide carried by said casing and supporting said holders, the slide being movable with respect to the casing to permit access to the holders, there being cooperating formations upon the slide and casing for limiting the relative motion thereof.

42. In a camera, the combination with a casing and a pair of film rolls, of a holder for each of said rolls, and a slide carried by said casing and supporting said holders, the slide being movable with respect to the casing to permit access to the holders, and a tripod-socket mounted upon said casing and projecting inwardly thereof, said slide including a portion equipped with a slot straddling the inner end of said socket; an end of said slot engaging said inner end of the socket when the slide is moved with respect to the casing, thereby limiting the said movement.

43. In a camera, in combination with a casing, a film-receiving and a film-feeding roll carried thereby and movable with respect thereto, an actuating member associated with both rolls for moving the same to expose a portion of film therebetween, stop means associated with the casing for latching the film-feeding roll in a predetermined position, and means operable by the actuating member for unlatching the film-feeding roll from its said position.

44. In a camera, in combination with a casing, a film-receiving and a film-feeding roll carried thereby and movable with respect thereto, an actuating member associated with both rolls for moving the same to expose a portion of film therebetween, stop means associated with the casing for latching the film-feeding roll in a predetermined position, a latch-releasing member carried by the film-feeding roll, and a finger carried by the actuating member; the latter being partly rotatable to cause the finger to engage the latch-releasing member, thereby unlatching said roll from its said position.

45. In a camera, in combination with a casing, a film-feeding roll and an actuating member both movable with respect thereto, latching means associated with said roll for locking the same against rotation in one direction, and means operable by reverse movements of the actuating member for respectively actuating and releasing the said latching means.

WILLIAM A. PETERS.